(12) United States Patent
Baert et al.

(10) Patent No.: US 11,486,146 B2
(45) Date of Patent: Nov. 1, 2022

(54) PANEL

(71) Applicant: Champion Link International Corporation, The Valley (AI)

(72) Inventors: Thomas Luc Martine Baert, Sint-Martens-Latem (BE); Tom Van Poyer, Jiaxing (CN); Sven Boon, Jiaxing (CN)

(73) Assignee: CHAMPION LINK INTERNATIONAL CORPORATION

( * ) Notice: Subject to any disclaimer, the term of this patent is extended or adjusted under 35 U.S.C. 154(b) by 0 days.

(21) Appl. No.: 16/929,720

(22) Filed: Jul. 15, 2020

(65) Prior Publication Data

US 2022/0018136 A1    Jan. 20, 2022

(51) Int. Cl.
*E04F 13/07* (2006.01)
*E04F 13/076* (2006.01)
*E04F 13/26* (2006.01)
*E04F 13/14* (2006.01)

(52) U.S. Cl.
CPC .......... *E04F 13/076* (2013.01); *E04F 13/142* (2013.01); *E04F 13/26* (2013.01)

(58) Field of Classification Search
CPC ....... E04F 13/076; E04F 13/26; E04F 13/142; E04F 13/0894; E04F 15/02038; E04F 15/085
See application file for complete search history.

(56) References Cited

U.S. PATENT DOCUMENTS

| | | | |
|---|---|---|---|
| 2,944,291 A | 10/1957 | Prior et al. | |
| 2,851,639 A * | 9/1958 | Ford | H05F 3/025 501/141 |
| 3,421,597 A | 1/1969 | Blau | |
| 3,651,184 A * | 3/1972 | Everhart et al. | C04B 33/02 264/680 |

(Continued)

FOREIGN PATENT DOCUMENTS

| | | |
|---|---|---|
| CA | 2523866 | 11/2004 |
| CN | 100419019 | 2/2007 |

(Continued)

OTHER PUBLICATIONS

Search Report and Written Opinion for Corresponding International Patent Application No. NL 2026068, dated Feb. 4, 2021.

(Continued)

*Primary Examiner* — Brian E Glessner
*Assistant Examiner* — Adam G Barlow
(74) *Attorney, Agent, or Firm* — Emerson, Thomson & Bennett, LLC; Roger D. Emerson; Peter R. Detorre

(57) ABSTRACT

The invention relates to a panel, in particular a floor panel or a wall panel configured for forming a floor or wall covering, the panel comprising at least one core layer, the core layer comprising at least one pair of opposite side edges which are provided with complementary coupling parts configured for interconnecting adjacent panels, the core layer comprising an upper core surface and a bottom core surface, and at least one ceramic tile, the ceramic tile comprising an upper surface and a bottom surface and the panel further comprising at least one further layer.

18 Claims, 1 Drawing Sheet

(56) References Cited

U.S. PATENT DOCUMENTS

Figure 1:
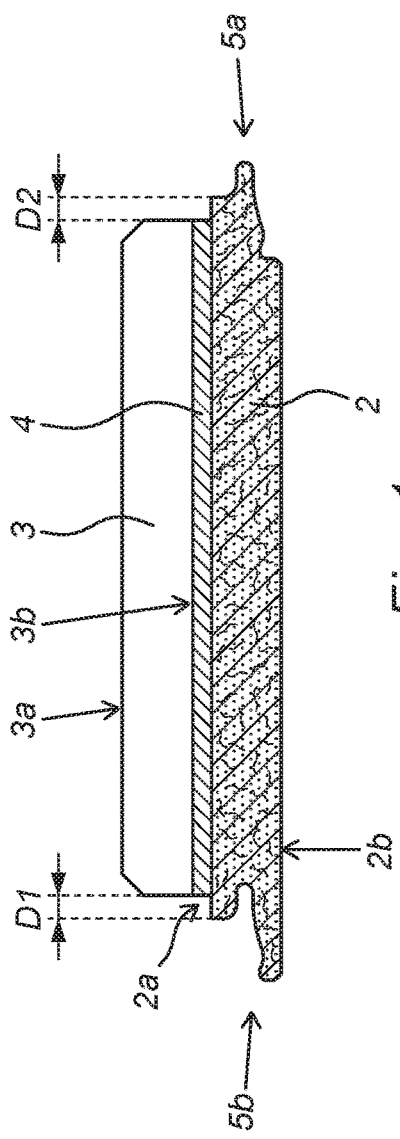

| | | | |
|---|---|---|---|
| 3,791,841 A * | 2/1974 | Carmellini | B44C 1/1756 |
| | | | 428/40.9 |
| 3,898,091 A * | 8/1975 | Stout | C03C 8/16 |
| | | | 501/75 |
| 3,931,428 A | 1/1976 | Reick | |
| 4,278,728 A | 7/1981 | Honda | |
| 5,277,952 A * | 1/1994 | Watras | B32B 17/067 |
| | | | 428/912.2 |
| 5,336,551 A | 8/1994 | Gravier | |
| 5,631,053 A | 5/1997 | Andersen | |
| 5,693,395 A | 12/1997 | Wine | |
| 5,776,580 A | 7/1998 | Rasmussen | |
| 6,688,061 B2 | 2/2004 | Garcia | |
| 6,761,794 B2 | 7/2004 | Mott | |
| 6,933,043 B1 | 8/2005 | Son | |
| 7,255,907 B2 | 8/2007 | Feigin et al. | |
| 7,399,510 B2 | 7/2008 | Dupouy | |
| 7,442,423 B2 * | 10/2008 | Miller | B32B 17/062 |
| | | | 52/390 |
| 7,866,103 B2 | 1/2011 | Marschke | |
| 7,918,062 B2 | 4/2011 | Chen | |
| 8,287,991 B2 | 10/2012 | Donelson | |
| 8,419,877 B2 | 4/2013 | Pervan | |
| 9,333,789 B2 * | 5/2016 | Manwiller | G03G 15/1625 |
| 10,328,680 B2 | 6/2019 | Pervan | |
| 10,828,881 B2 | 11/2020 | Bergelin | |
| 2003/0233809 A1 | 12/2003 | Pervan | |
| 2005/0208258 A1 | 9/2005 | Hosokawa | |
| 2005/0286397 A1 | 12/2005 | Inagaki | |
| 2006/0115442 A1 | 6/2006 | Katz | |
| 2007/0033891 A1 | 2/2007 | Imbabi | |
| 2008/0149137 A1 | 6/2008 | Steinbrenner | |
| 2008/0318004 A1 | 12/2008 | Ruhe | |
| 2009/0011279 A1 | 1/2009 | Wisenbaker, Jr. et al. | |
| 2009/0017320 A1 | 1/2009 | Donelson | |
| 2009/0155612 A1 | 6/2009 | Pervan | |
| 2009/0235607 A1 | 9/2009 | Chen | |
| 2009/0308001 A1 | 12/2009 | Wu | |
| 2010/0115974 A1 | 5/2010 | Okaza | |
| 2011/0067336 A1 | 3/2011 | McDonald | |
| 2013/0295346 A1 | 11/2013 | Ferguson | |
| 2014/0087156 A1 | 3/2014 | Sarkis | |
| 2014/0134402 A1 | 5/2014 | Pallon | |
| 2014/0272302 A1 | 9/2014 | Ciuperca | |
| 2015/0059621 A1 | 3/2015 | Hauber | |
| 2015/0121793 A1 | 5/2015 | Segeart | |
| 2016/0214395 A1 | 7/2016 | Torfs | |
| 2016/0288447 A1 | 10/2016 | Cordeiro | |
| 2016/0369507 A1 | 12/2016 | Pervan | |
| 2017/0204616 A1 | 7/2017 | Scholz | |
| 2017/0217133 A1 | 8/2017 | Jordan et al. | |
| 2018/0147873 A1 | 5/2018 | De Mondt | |
| 2018/0258651 A1 | 9/2018 | Meersseman | |
| 2018/0283014 A1 | 10/2018 | Hodgkins et al. | |
| 2018/0339547 A1 * | 11/2018 | Klapperstück | B44C 5/04 |
| 2019/0024383 A1 * | 1/2019 | Shin | E04F 13/142 |
| 2019/0292793 A1 | 9/2019 | Van Vlassenrode | |
| 2019/0308914 A1 | 10/2019 | Kong | |
| 2019/0383031 A1 | 12/2019 | Baert | |
| 2020/0039190 A1 | 2/2020 | Lenaerts | |
| 2020/0080321 A1 * | 3/2020 | Baert | E04F 15/102 |
| 2020/0123788 A1 * | 4/2020 | Baert | E04F 15/02 |
| 2020/0131784 A1 | 4/2020 | Boucke | |
| 2020/0207118 A1 | 7/2020 | Lenaerts | |
| 2020/0218415 A1 | 7/2020 | Jang | |
| 2020/0308846 A1 * | 10/2020 | Josefsson | E04F 15/02033 |
| 2020/0378114 A1 * | 12/2020 | Quirijns | E04B 2/7403 |

FOREIGN PATENT DOCUMENTS

| | | |
|---|---|---|
| CN | 101386516 | 3/2009 |
| DE | 102012000468 | 7/2013 |
| EP | 2060389 | 5/2009 |
| EP | 2690142 A1 | 1/2014 |
| EP | 3536874 | 9/2019 |
| GB | 2509821 | 7/2014 |
| JP | H0828015 | 1/1996 |
| KR | 20140066086 | 5/2014 |
| SE | 19503648 | 3/2019 |
| WO | 2007111552 | 10/2007 |
| WO | 2012004701 | 1/2012 |
| WO | 2012061300 | 5/2012 |
| WO | 2014007738 | 1/2014 |
| WO | 2014011110 | 1/2014 |
| WO | 2018234561 A1 | 12/2018 |
| WO | 2019064113 A1 | 4/2019 |
| WO | 2020009973 | 1/2020 |
| WO | 2020114645 | 6/2020 |
| WO | 2020197475 | 10/2020 |

OTHER PUBLICATIONS

Search Report and Written Opinion for Corresponding International Patent Application No. NL 2025620, dated Feb. 8, 2021.

Search Report and Written Opinion for Corresponding International Patent Application No. NL 2026069, dated Feb. 5, 2021.

International Search Report and Written Opinion of corresponding Application No. NL 2025119 dated Jan. 14, 2021.

International Search Report and Written Opinion of corresponding PCT Application No. NL2025684, dated Mar. 3, 2021.

International Search Report and Written Opinion for corresponding App. No. NL 2024807 dated Sep. 18, 2020.

International Search Report and Written Opinion for corresponding App. No. NL 2024806 dated Nov. 26, 2020.

International Search Report and Written Opinion for corresponding PCT App. No NL 2024805 dated Sep. 23, 2020.

* cited by examiner

PANEL

The invention relates to a panel, in particular a floor panel or a wall panel configured for forming a floor or wall covering.

Ceramic tiles are often used for both flooring- and wall coverings. They benefit of a good strength and durability and in addition to that they are appreciated for their appealing aesthetic appearance. Due to their good temperature resistance and their hardness, ceramic tiles benefit a high wear and corrosion resistance, which make them suitable for both indoor- and outdoor use. A drawback of the use of ceramic tiles it that they are both difficult to install and difficult to remove, due to their installation on mortar. The bottom surface of conventional tiles is usually designed to optimize contact surface with mortar through the application of cavities up to several millimeters deep at said bottom surface that allow more complete adhesion with said mortar during installation. It can be said that the mortar is allowed to fill the cavities at the back surface of conventional tile, so as to support the tile body to withstand intensive use and heavy loads without breaking. This is achieved by laying the tiles on large amounts of mortar during installation, generally around 5 pounds (lbs) per 10 square feet, which completely covers the said back surface. After installation and curing of the mortar, generally a grout is applied in the gaps between the tiles for visual effect and achieving a waterproof bond. This grout is generally composed of a cement or epoxy and is hard and brittle after curing. Correct installation of ceramic tiles without height differences and an even grout or gap between tiles on this thick layer of mortar is a precision task which typically requires an expert. The installation can be said to be permanent as there is a cured bond between the substrate and tiles and between individual tiles. Therefore, the removal of tiles is generally difficult, costly, and time consuming.

It is known to provide a combination of a ceramic tile and a polymer-, mineral- or wood-based core layer wherein the core layer is provided with interconnecting coupling means in order to allow for easier and floating installation of the tiles, obviating the need for adhesives or mortar and enabling installation even by the non-professional or home handyman. This combination is achieved through the application of a bonding system in between the core layer surface and the ceramic top layer, wherein the bonding system is generally an adhesive layer. When the adhesive layer is applied on the back surface of the ceramic tile, it is able to ingress into the tile prior to solidifying or curing due to its relatively high liquidity. The expansion rate of said adhesive when exposed to extreme temperatures, can create unwanted stresses in the core body of the tile, which leads to breakage, cracks, and hairline fractures.

Moreover, the application of such an adhesive creates difficulties in production, and leads to unwanted staining or discoloration that can become evident in the decorative top surface of the tile.

Moreover, as described above, conventional ceramic tiles feature cavities on the back surface to ensure increased bonding with a thick layer of mortar or adhesive. However, when these conventional ceramic tiles are combined with a substrate that does not offer support to the tile, they are prone to fracturing and breakage. This can be easily explained due to insufficient support on the back surface of the tiles at the location of the cavities. Even slight stress in the body of the ceramic, porcelain and stone tiles occurring during use can lead to deformation at said location on the back surface, surface crazing (multiple hairline fractures) on the top surface opposite of said location, and breakage. It can be said that conventional tiles featuring cavities on the back surface, designed to be installed on mortar, are not suitable to be combined with a polymer-, mineral- or wood-based core layer.

It is a goal of the invention to provide a panel which at least partially overcomes the abovementioned drawbacks, or which is at least an alternative to the presently known panels.

The invention provides thereto a panel, in particular a floor panel or a wall panel configured for forming a floor or wall covering, the panel then comprises:
- at least one core layer comprising at least one pair of opposite side edges which is provided with complementary coupling parts, an upper core surface and a bottom core surface; and
- at least one ceramic tile comprising an upper surface and a bottom surface, wherein the ceramic tile's bottom surface is attached to the upper core surface of the core layer;

wherein the panel, and in particular the ceramic tile of the panel, comprises at least one protective layer located at the bottom surface of the ceramic tile.

The panel according to the invention benefits of the presence of at least one protective layer, which is located at the bottom surface of the ceramic tile. The protective layer is typically configured to protect at least a part of the ceramic tile particularly at least a part of the bottom surface of the ceramic tile. Due to the presence of the at least one protective layer, the durability of the panel can be improved. The protective layer can provide a reinforcing function for the ceramic tile and to the overall panel structure. Ceramic tiles typically feature a certain porosity and are classified according to their water absorption rate. For example, ceramic tiles that have a low water absorption rate of less than 0.5% can be called or considered as porcelain tiles. The top surface of ceramic tiles is generally finished with a lacquer or glazing that is completely waterproof. There is, however, a possible ingress into the back surface of the tiles by liquids or materials that have a high liquidity. Liquidity or viscosity can be measured in pascal-seconds or Pas. To illustrate, at 20 degrees Celsius, the viscosity or liquidity of water is 1 Pas, of most adhesives 3 Pas, of ketchup 50 Pas, of peanut butter 250 Pas, of silicone putty 100,000 Pas. It can be said that a material with a viscosity of less than 1,000 Pas has a comparatively high liquidity, and a material with a viscosity of more than 1,000 Pas has a comparatively low liquidity. A material of a high liquidity is able to ingress into the pores and/or core body of a ceramic or porcelain tile through the back/bottom surface. The core body of the ceramic tile can be defined as the region of the tile enclosed between the upper surface and the bottom surface. The presence of a protective layer, which preferably forms an integral part of the ceramic tile, can prevent ingress of the adhesive into the ceramic tile. The protective layer according to the present invention will effectively form a boundary layer that reduces the risk of crazing and hairline fractures related to expansion and contraction of alien materials in the body of the ceramic tile caused by thermal fluctuations. The preferably integrally formed protective layer seals off the pores of the bottom layer of the ceramic tile, thereby preventing the transmission of liquids to the core body of the ceramic tile. It may also help in sealing off any possible fracture points at the bottom surface of the tile. In such cases, the protective layer acts as a crack suppression layer, reinforcing layer, or balancing layer to enable installation on flat surfaces.

The panel according to the present invention also gives the advantage of easy installation through the built-in locking mechanism on the panels' edges. This is embodied by the panel which comprises a combination of at least one ceramic tile and at least one core layer having at least one pair of opposite side edges with complementary coupling parts. The complementary coupling parts facilitate the installation of two or more adjacent panels for wall or floor coverings. This solution waives the need for experts in installing, removing, or replacing the wall or floor coverings.

The complementary coupling parts are typically configured for interconnecting adjacent panels. Typically, at least one pair of opposite side edges of the core layer is provided with complementary coupling parts. For example, the core layer comprises at least one pair of complementary coupling parts on at least two of its opposite side edges. Said coupling parts may for example be interlocking coupling parts configured for mutual coupling of adjacent panels on multiple directions. Preferably, said interlocking coupling parts provide locking in both horizontal and vertical directions. Any suitable interlocking coupling parts as known in the art could be applied. For example, said interlocking coupling parts may be in the form of complementary tongue and groove, male and female receiving parts, a projecting strip and a recess configured to receive said strip or any other suitable form. It is conceivable that the complementary coupling parts require a downward scissoring motion when engaging or are locked together by means of a horizontal movement. It is conceivable for provisions of reinforcement in the interlocking coupling parts to improve strength and prevent breakage thereof during installation of the panels. For example, the complementary or interlocking coupling parts may be reinforced with materials such as but not limited to fiberglass mesh, reinforcing sheets, carbon fibers, carbon nanotubes, ceramics, glass, arrays of metallic or non-metallic rods, or polymer compounds integrally formed in the core layer.

The protective layer can also be referred to as a boundary layer. The core layer as used in the panel according to the present invention is configured to provide support to the ceramic tile. Typically, at least one core layer is substantially flat. In particular, the upper core surface and/or the bottom core surface of the core layer are substantially flat. The invention also relates to a panel, in particular a floor panel or a wall panel configured for forming a floor or wall covering, the panel comprising at least one core layer, the core layer comprising at least one pair of opposite side edges which is provided with complementary coupling parts, the core layer comprising an upper core surface and a bottom core surface, and at least one ceramic tile, the ceramic tile comprising an upper surface and a bottom surface, wherein the ceramic tile is attached to the upper core surface of the core layer, wherein the ceramic tile comprises at least one protective layer located at its bottom surface. This embodiment is beneficial as the protective layer can protect the ceramic tile in an efficient manner. The ceramic tile can, for example, be attached to the upper core surface of the core layer by means of an of adhesive or an adhesive layer. It is for example possible that the ceramic tile is attached to the upper core surface by means of a glue such as a polyurethane glue.

A least one protective layer may form an integral part of the ceramic tile. The protective layer preferably forms an integral part of the ceramic tile such that it can provide a reinforcing function for the ceramic tile and to the overall panel structure. In case the bottom surface of the ceramic tile comprises the integrally formed protective layer, said protective layer can prevent the ingress of adhesive, glue and other liquid substances into the ceramic tile. The panel according to the present invention wherein the ceramic tile comprises at least one protective layer located at the bottom surface of the ceramic tile which forms integral part of the ceramic tile, also has the surprising added effect of a beneficial increase in surface energy of the ceramic tile's bottom surface. The surface energy of a material to be bonded with an adhesive is a key factor determining the adhesive strength between the adhesive and said material. A material with a high surface energy allows easy wetting, allows the adhesive to spread easily across its surface, and offers strong adhesion; while a material with a low surface energy will seem to repel the adhesive and cause bonding failure. The ceramic bottom surface of ceramic tiles has a naturally low surface energy of less than 25 dynes/cm. To improve adhesion when installing on mortar or glues, pores are commonly allowed or even engineered to exist on the bottom surface of conventional tiles. According to the present invention, the addition of the integrated protection layer, which seals off the pores on the bottom surface of the tile, increases the surface energy of the bottom surface of the ceramic tile to more than 73 dynes/cm, greatly enhancing the compatibility between ceramic tile and adhesive as disclosed in the invention, and allowing sufficient bonding with an adhesive layer to form the envisioned product. Hence, an embodiment of the panel is also conceivable wherein the bottom surface of the ceramic tile has a surface energy higher than 30 dynes/cm, and preferably higher than 50 dynes/cm, more preferably higher than 73 dynes/cm.

Preferably, at least one protective layer covers at least a portion of the bottom surface of the ceramic tile. In a further preferred embodiment, at least one protective layer covers at least 50% or preferably at least 80% of the bottom surface (area) of the ceramic tile. By covering at least 50% or preferably at least 80% of the bottom surface of the ceramic tile, the protective layer can already provide a relatively good protective function. In a further preferred embodiment, at least one protective layer substantially entirely covers the bottom surface of the ceramic tile. Preferably, the surface areas of the protective layer and the ceramic tile's bottom layer are substantially equal. In such a way, the protection of the bottom surface of the ceramic tile can be guaranteed. It is further possible that at least one protective layer seals off at least a portion of the bottom surface of the ceramic tile. In a further preferred embodiment, at least one protective layer seals off at least 50% or preferably at least 80% of the bottom surface (area) of the ceramic tile. By sealing off at least 50% or preferably at least 80% of the bottom surface of the ceramic tile, the protective layer can already provide a relatively good protective function. In a further preferred embodiment, at least one protective layer substantially entirely seals off the bottom surface of the ceramic tile.

The thickness, or height, of at least one protective layer typically varies between 0.05 and 5 mm, preferably between 0.1 mm and 2 mm and more preferably between 0.7 mm and 1.5 mm. It is also conceivable that the thickness varies between 0.1 mm and 5 mm, preferably between 0.5 mm and 2 mm. The protective layer could also have a thickness between 0.7 mm and 1.8 mm. Preferably, the (average) thickness, or height, of at least one protective layer is less than 50% of the thickness, or height, of the ceramic tile, preferably less than 30%, more preferably less than 20%. Preferably, the thickness of the protective layer is substantially equal over the entire protective layer.

In a beneficial embodiment, the protective layer is impermeable and more preferably exhibits impermeability to liquids. The protective layer being impermeable may further contribute to the durability of the panel by further preventing the ingress of alien materials into the core body of the ceramic tile. A liquid impermeable protective layer may further enhance the protective function of the protective layer and thus further contribute to the durability of the panel. It is also conceivable that the protective layer is impermeable to vapor.

It is for example conceivable that the integrally formed protective layer is obtained via heat treatment of the ceramic tile as exhibited in the glazing of at least a part of the ceramic tile. In such cases, it is conceivable that the bottom surface of the ceramic tile comprises a ceramic glaze. Hence, the protective layer can be a ceramic glaze layer provided at the bottom surface of the ceramic tile. The said integrally formed glaze layer is typically impermeable and/or waterproof. At least one protective layer forming an integral part of the ceramic tile is preferably hardened at a temperature between 600 to 1500 degrees Celsius.

It is conceivable that at least one protective layer comprises at least one ceramic flux. It is also conceivable that the protective layer is a ceramic glaze layer comprising clay and/or fluxes, such as a fluxing oxide. The protective layer may for example comprise 5 to 60 wt. % clay and/or fluxes. The preferably integrally formed protective layer may, for example, comprise a ceramic flux. Such ceramic flux could promote partial or complete liquefaction of the protective layer. The fluxes or ceramic fluxes could include compounds such as but not limited to: glass materials, glazes, or oxides containing magnesium, calcium, lead, calcium carbonate, sodium, potassium, lithium, barium, zinc, strontium, manganese, boron, feldspar, talc, and/or dolomite, and can also be boric oxide, silicon oxide, aluminium oxide, zinc oxide, lithium oxide, potassium oxide, sodium oxide or soda, strontium oxide, as well as magnesium oxide.

This ceramic glaze layer is preferably applied on the bottom surface of the ceramic tile, then undergoes a firing process usually within the range between 20 to 1200 degrees Celsius with a firing time between 5 to 48 hours and more preferably between 10 to 24 hours. At a preferred temperature between 950 to 1200 degrees Celsius, glazing and vitrification of the ceramic layer occurs. In some cases, the firing temperature may be increased until 1500 degrees Celsius. In this step, the fluxes or ceramic fluxes that are present in the ceramic layer form a glazing layer by lowering the melting point or melting temperature of the overall mixture. The vitrification process in the bottom surface of the ceramic tile permeates the undesired pores of the ceramic tile as otherwise present in conventional tiles. This process can be said to create an impermeable layer or more preferably an impermeable glazing layer formed on the bottom surface of the ceramic tile. This impermeable glazing layer lowers the porosity of the ceramic tile and seals off the pores, thus preventing the transmission of liquids to the body of the ceramic tile. It also helps in sealing off any possible fracture points. It also reinforces and evens the bottom surface of the ceramic tile which enables it to be adhered onto a flat surface. This approach of using an impermeable glazing layer as the protective layer then expands the application of the ceramic tile in combination with a panel core layer for floating installation, to areas with running water such as in laundry areas or bathrooms, and/or high-traffic areas.

In a possible embodiment of this invention, an uneven spreading of the protective layer may be desirable particularly to achieve a gradual progression over the surface of the ceramic tile adhered to the core layer. The said gradual progression of the protective layer creates thicker layers along the sides of the panel where there are greater chances of water penetration and higher risk of breakage. The thickness of the protective layer typically varies between 0.1 and 5 mm and more preferably between 0.2 and 1 mm. The uneven thickness of the protective layer can be achieved during the production of the ceramic tiles wherein glazing occurs. In this phase, the oxides or glaze-forming compounds are concentrated at the bottom of the ceramic. This can be done by hardening the ceramic at temperature values between 600 to 1500 degrees Celsius. It is preferred that the oxides or glaze-forming compounds have higher concentrations at the sides preferably up to 20 mm from the peripherals or edges of the ceramic tile. This also ensures that sufficient amounts and thickness of the protective layer covers the locking mechanism for reinforcement.

The at least one protective layer may comprise at least one additive. The at least one additive is preferably configured to mechanically reinforce the protective layer. Initial experiments conducted suggests the use of yttrium-stabilized polycrystalline tetragonal zirconia (3Y-TZP). Preferably, 25 to 35 wt % of 3Y-TZP is added to the protective layer. This specific range is found to positively contribute to the mechanical properties of the protective layer. Other non-limiting examples of additives which could be used are anortite ($CaO.Al2O3.2SiO2$) and/or zirconium oxides ($ZrO2$). These additives are found to provide an increased temperature stability. The use of zinc oxide ($ZnO$) and/or mullite-based glass-ceramic materials ($3Al2O3.2SiO2$) or mullite glazes ($Al6Si2O13$) may also be used in the protective layer having desirable effects in the mechanical, thermal, creep, and/or chemical properties. Increased thermal stability, thermal shock resistance, mechanical strength, and dielectric properties can also be achieved by using ceramics comprising cordierite ($2MgO.2Al2O3.5SiO2$).

In yet another embodiment, the protective layer comprises a thixotropic layer, preferably having a high clay content. The thixotropic layer could create an added cushioning and/or crack suppression layer. Hence, at least one additive can be chosen from the group of: yttrium-stabilized polycrystalline tetragonal zirconia (3Y-TZP), anortite ($CaO.Al2O3.2SiO2$), zirconium oxides ($ZrO2$), zinc oxide ($ZnO$), mullite-based glass-ceramic materials ($3Al2O3.2SiO2$), mullite glazes ($Al6Si2O13$), cordierite ($2MgO.2Al2O3.5SiO2$) and/or combinations thereof.

The ceramic tile as used in the panel according to the present invention may in a possible embodiment comprise at least 50% by weight of $SiO2$ particularly between 60 and 70% by weight. The ceramic tile may further comprise at least 15% by weight of $Al2O3$ particularly between 25 and 35% by weight. Possibly, the ceramic tile may comprise 5 to 10% by weight of various natural substances. Typically, at least one ceramic tile has a thickness between 2 and 20 mm, preferably between 5 and 15 mm, more preferably between 6.5 and 8 mm.

In a beneficial embodiment of the panel, at least part of the upper surface of the ceramic tile is provided with at least one decorative pattern or decorative image. It is possible that such decorative image or pattern is provided via conventional or traditional printing means or via digital and/or inkjet printing. It is also possible that at least one decorative pattern is formed by relief provided in the upper surface of the ceramic tile.

The bottom surface of the ceramic tile is typically substantially flat. This may improve the ability to obtain sufficient connection between the ceramic tile and the other layers such as the protective layer and the core layer. This structure may decrease the risk of breaking points especially when the ceramic tile is combined with a core layer that features a substantially flat top surface.

In a preferred embodiment of the panel, the peripheral edges of at least one ceramic tile are positioned at a predetermined distance from the peripheral edges of at least one core layer such that a grout is formed when a plurality of panels are interconnected. Such grout could be filled with a grouting material to fill and/or seal the seams between adjacent panels. The grouting material could be any type of grouting material suitable for use in combination with ceramic tiles. Preferably, said predetermined distance is equal over the entire length and/or width of the panel. Due to the peripheral edges of the ceramic tile being positioned at a predetermined distance from the peripheral edges of the core layer there is no need for the user to align the ceramic tiles in order to obtain an usable grout. Hence, when using panels of this embodiment, grouts between adjacent ceramic tiles are naturally formed when a plurality of panels are interconnected. When the grouts are filled with a grouting material, a relatively strong interconnection between adjacent ceramic tiles can be obtained.

The predetermined distance can for example be at least 0.5 mm, preferably at least 1 mm. Hence, the peripheral edges of the ceramic tile can be positioned in at least 0.5 mm distance from the peripheral edges of the core layer. Hence, in case all peripheral edges of the ceramic tile are positioned in at least 0.5 mm distance from the peripheral edges of the core layer, when interconnecting a plurality of such panels, a grout of at least 1 mm will be formed around each ceramic tile. It is, for example, conceivable that that the peripheral edges of the ceramic tile are positioned between 0.5 mm and 3 mm distance from the peripheral edges of the core layer. For example, the peripheral edges of the ceramic tile are positioned in at least 1 mm distance from the peripheral edges of the core layer.

It is conceivable that at least one core layer comprises a composite material particularly a mineral composite material. The core layer may, for example, comprise a magnesium oxide or MgO-based composite. The core layer may, for example, comprise magnesium chloride (MgCl2) and/or magnesium sulfate (MgSO4). The composite core layer may for example comprise at least 20% by weight of magnesium oxide. A non-limiting example of a possible composite core layer, is a core layer comprising 30 to 40% by weight magnesium oxide, 10 to 20% by weight magnesium chloride or magnesium sulfate, 10 to 15% by weight water, 5 to 10% by weight magnesium hydroxide, 5 to 10% by weight calcium carbonate, 5 to 50% by weight lignocellulose (e.g. wood fibers or cork) and/or 10-15% by weight additives. It is found that a composite core layer particularly a mineral composite core layer has good stability to heat which is also beneficial for the panel as such. The density of at least one core layer is preferably between 1200 to 2000 kg/m3 and more preferably between 1400 to 1600 kg/m3.

However, it is also conceivable that the density of at least one core layer is about 2000 kg/m3. The latter is for example possible when the core layer comprises an thermoplastic mineral composite. The thermoplastic mineral composite core layer may for example comprise 60 to 70% by weight of calcium carbonate, 20 to 25% by weight of polyvinyl chloride and possibly 5 to 10% by weight of additives. At least one core layer may comprise a density gradient, for example wherein the density near the upper core surface is higher than the density near the bottom core surface, or wherein the density near the upper core surface and the bottom core surface is higher than the density of a central region situated between said upper core surface and bottom core surface. A further non-limiting example of a possible core layer is an HDF based core layer comprising cellulose and a thermosetting resin. It is also conceivable that the core layer is a woodbased core layer comprising cellulose and/or a geopolymer based on magnesium oxide.

The core layer may for example have a thickness of at least 3 mm. It is for example possible that the thickness of the core layer is between 3 and 9 mm, preferably between 4 mm and 5.5 mm or between 5.5 mm and 7 mm. It is conceivable that at least one core layer comprises at least one reinforcing layer. The reinforcing layer can for example be a reinforcing mesh. Possibly, the core layer comprises at least two reinforcing layers, wherein a first reinforcing layer is located near the upper core surface and wherein a further reinforcing layer is located near the bottom core surface. Preferably, at least one reinforcing layer comprises a mesh or web, preferably comprising fiberglass, jute and/or cotton.

In a further possible embodiment, the panel may comprise at least one backing layer. It is for example conceivable that at least one backing layer is attached to the bottom core surface of the core layer. The backing layer may for example be attached to the core layer by means of an adhesive layer. The presence of a backing layer may improve the impact insulation class and sound transmission performance of the panel. Further, the backing layer may allow to absorb some subfloor irregularities. Preferably, the backing layer is made of a low-density material comprising irradiation-crosslinked polyethylene (IXPE), ethylene-vinyl acetate (EVA), cork and/or other materials with similar sound-dampening properties. A non-limiting example of a possible backing layer is a moisture-proof acoustic pad. The backing layer may for example be configured to improved acoustical performance of the panel. The thickness of at least one backing layer may for example be between 0.5 and 10 mm, preferably between 0.8 and 1.5 mm. Possibly, at least one backing layer may have a thickness of about 1 mm. The density of at least one backing layer is preferably between 85 to 200 kg/m3.

The panel according to the invention may further comprise at least one further protective layer. At least one further protective layer can for example be a substantially solid layer. Hence, the further protective layer can be applied during manufacturing of the panel as a solid layer. In case a further protective layer is applied, it is preferred that said further protective layer is positioned between the protective layer and the core layer. It is for example conceivable that at least one further protective layer is a film layer. The film layer may for example be a stretchable film layer. In a further preferred embodiment, at least one protective layer can be a heat shrinkable film layer. Such heat shrinkable film can be applied such that it substantially encloses at least part of the ceramic tile particularly the bottom surface of the ceramic tile. Hence, at least part of the ceramic tile may be wrapped by the film layer. A substantially formfitting connecting between the film layer and at least part of the ceramic tile may be obtained. The heat shrinkable further protective layer may for example be made of polyolefin. It is also possible that the heat shrinkable protective layer comprises PVC, polyethylene and/or polypropylene. It is also conceivable that at least one further protective layer is a shock absorbing layer. The further protective layer can for example be a foamed polymer layer.

The invention also relates to a method for manufacturing a panel, in particular a floor panel or a wall panel configured for forming a floor or wall covering, the method comprising the steps of:

a) providing at least one core layer, the core layer comprising at least one pair of opposite side edges which is preferably provided with complementary coupling parts, the core layer comprising an upper core surface and a bottom core surface;

b) forming and/or providing at least one ceramic tile, the ceramic tile comprising an upper surface and a bottom surface;

c) subjecting the bottom surface of the ceramic tile to a firing process such that glazing and/or vitrification of the bottom layer occurs; and d) attaching the ceramic tile, and in particular the bottom layer of the ceramic tile to the upper core surface of the core layer.

The method according to the present invention experiences the same benefits as described for the corresponding panel according to the present invention. During step c), a protective layer is formed which in particular forms an integral part of the ceramic tile. Due to the presence of at least one integrally formed protective layer the durability of the panel can be improved. The protective layer which forms an integral part of the ceramic tile can further provide a reinforcing function for the ceramic tile and thus for the panel as such.

Step c) is typically performed at a temperature in the range of 20 to 1200 degrees Celsius particularly between 950 and 1200 degrees Celsius and/or for a duration between 5 to 48 hours, and preferably between 10 to 24 hours. The temperature and duration to be applied are dependent on the desired final properties of the protective layer, such as the thickness and/or density. The protective layer may further comprise at least one additive. The additive may comprise one or more of the following non-limiting examples: yttrium-stabilized polycrystalline tetragonal zirconia (3Y-TZP), anortite ($CaO.Al_2O_3.2SiO_2$), zirconium oxides ($ZrO_2$), zinc oxide (ZnO), mullite-based glass-ceramic materials ($3Al_2O_3.2SiO_2$), mullite glazes ($Al_6Si_2O_{13}$) and/or cordierite ($2MgO.2Al_2O_3.5SiO_2$).

The invention also relates to a panel obtained via a method according to the present invention.

Figure 2:
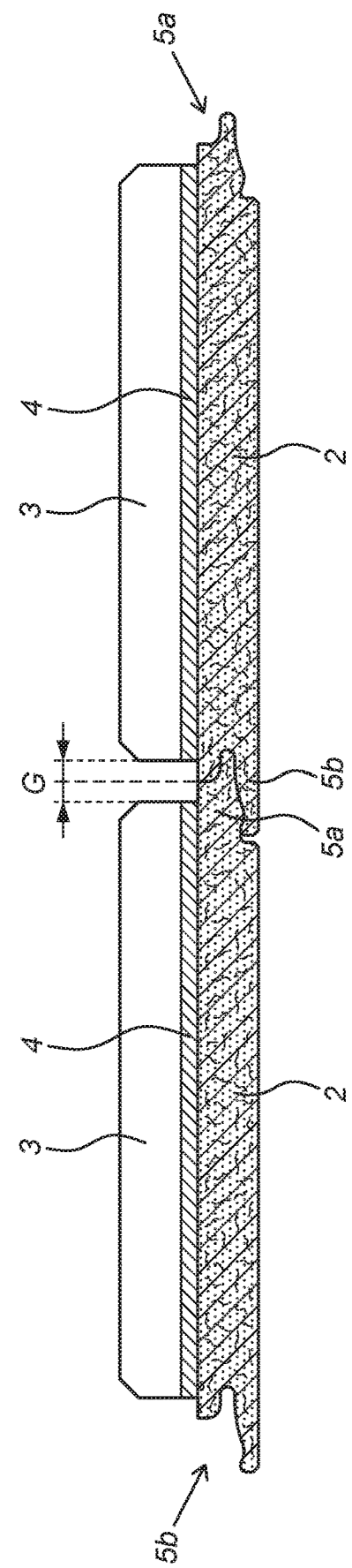

The invention will be further explained with reference to the appended figures wherein:

FIG. 1 shows a cross section of a possible embodiment of the panel according to the present invention, and FIG. 2 two panels as shown in FIG. 1 in a mutually coupled position.

Similar references in these figures refers to the same or equivalent technical features or components.

FIG. 1 shows a panel 1, in particular a floor panel 1 or wall panel 1 configured for assembling a floor or wall covering by interconnecting a plurality of said panels 1 with each other. The panel 1 comprises a core layer 2 and a ceramic tile 3. The core layer 2 comprises pairs of opposite side edges, wherein at least one of said pair of opposite edges comprising complementary coupling parts 5a, 5b. The core layer 2 comprises an upper core surface 2a and a bottom core surface 2b. The ceramic tile 3 comprises an upper surface 3a and a bottom surface 3b. The panel further comprises a protective layer 4 provided at the bottom surface 3b of the ceramic tile 3. The protective layer 4 forms integral part of the ceramic tile 3. The protective layer 4 is preferably impermeable and covers at least part of the bottom surface 3b of the ceramic tile 3. In the shown embodiment, the peripheral edges of the ceramic tile 3 are positioned at a predetermined distance D1, D2, from the peripheral edges of the core layer 2. In the shown embodiment, the protective layer 4 substantially entirely covers the bottom surface 3b of the ceramic tile 3.

FIG. 2 shows a cross sectional view of two panels 1 as shown in FIG. 1 which are mutually coupled. It can be seen that the peripheral edges of each ceramic tile 3 are positioned at a predetermined distance D1, D2, from the peripheral edges of the core layer 2 such that a grout G is formed when a plurality of panels 1 are interconnected. The grout G has a length which substantially equals the abovementioned predetermined distances D1, D2. The grout G can be filled with a grouting material, in order to fill and/or seal the seams between the adjacent panels 1.

The above-described inventive concepts are illustrated by several illustrative embodiments. It is conceivable that individual inventive concepts may be applied without, in so doing, also applying other details of the described example. It is not necessary to elaborate on examples of all conceivable combinations of the above-described inventive concepts, as a person skilled in the art will understand numerous inventive concepts can be (re)combined in order to arrive at a specific application.

The verb "comprise" and conjugations thereof used in this patent publication are understood to mean not only "comprise", but are also understood to mean the phrases "contain", "substantially consist of", "formed by" and conjugations thereof. When it is referred to reinforcing layer also a reinforcing element can be meant, or vice versa.

The invention claimed is:

1. A panel configured for forming a floor or wall covering, the panel comprising:

at least one core layer, the core layer comprising at least one pair of opposite side edges which is provided with complementary coupling parts, the core layer comprising an upper core surface and a bottom core surface; and at least one ceramic tile, the ceramic tile comprising an upper surface and a bottom surface, wherein the ceramic tile is attached to the upper core surface of the core layer by means of an adhesive layer;

wherein the ceramic tile comprises at least one protective layer located at its bottom surface, wherein the at least one protective layer forms an integral part of the ceramic tile, and wherein the at least one protective layer is formed by a ceramic glaze layer comprising clay and/or fluxes.

2. The panel according to claim 1, wherein the at least one protective layer is impermeable to liquids.

3. The panel according to claim 1, wherein the at least one protective layer covers at least part of the bottom surface of the ceramic tile.

4. The panel according to claim 1, wherein the at least one protective layer covers and/or seals off at least 50% of the bottom surface of the ceramic tile.

5. The panel according to claim 1, wherein the at least one protective layer has a thickness between 0.05 and 5 mm.

6. The panel according to claim 1, wherein the at least one protective layer comprises at least one ceramic flux.

7. The panel according to claim 1, wherein the at least one protective layer comprises an uneven thickness ranging between 0.1 and 5 mm.

8. The panel according to claim 1, wherein the at least one protective layer comprises at least one additive, wherein the at least one additive is chosen from the group comprising of: yttrium-stabilized polycrystalline tetragonal zirconia (3Y-

TZP), anortite (CaO.Al$_2$O$_3$.2SiO$_2$), zirconium oxides (ZrO$_2$), zinc oxide (ZnO), mullite-based glass-ceramic materials (3Al$_2$O$_3$.2SiO$_2$), mullite glazes (Al$_6$Si$_2$O$_{13}$) and/or cordierite (2MgO.2Al$_2$O$_3$.5SiO$_2$).

9. The panel according to claim 1, wherein the at least one ceramic tile has a thickness between 2 and 20 mm.

10. The panel according to claim 1, wherein the bottom surface of the at least one ceramic tile is substantially flat.

11. The panel according to claim 1, wherein at least part of the upper surface of the ceramic tile is provided with at least one decorative image.

12. The panel according to claim 1, wherein the peripheral edges of at least one ceramic tile are positioned at a predetermined distance from the peripheral edges of the at least one core layer such that a grout is formed when a plurality of panels are interconnected.

13. The panel according to claim 12, wherein the predetermined distance is at least 0.5 mm.

14. The panel according to claim 1, wherein at least one core layer comprises a mineral composite material.

15. The panel according to claim 1, wherein at least one core layer has a density between 1200 and 2000 kg/m3.

16. The panel according to claim 1, wherein at least one core layer has a thickness between 3 mm and 9 mm.

17. A method for manufacturing a panel configured for forming a floor or wall covering, the method comprising the steps of:
  a) providing at least one core layer, the core layer comprising at least one pair of opposite side edges which is provided with complementary coupling parts, the core layer comprising an upper core surface and a bottom core surface;
  b) providing or forming at least one ceramic tile, the ceramic tile comprising an upper surface and a bottom surface;
  c) subjecting the bottom surface of the ceramic tile to a firing process such that glazing and/or vitrification of the bottom layer occurs; and
  d) attaching the bottom layer of the ceramic tile to the upper core surface of the core layer.

18. The method according to claim 17, wherein step c) is performed at a temperature in the range of 20 to 1200 degrees Celsius.

* * * * *